(12) United States Patent
Lechner

(10) Patent No.: US 7,584,190 B2
(45) Date of Patent: *Sep. 1, 2009

(54) DATA FILES SYSTEMS WITH HIERARCHICAL RANKING FOR DIFFERENT ACTIVITY GROUPS

(75) Inventor: Ulrich Lechner, Oettingen (DE)

(73) Assignee: Crossroads Systems, Inc., Austin, TX (US)

( * ) Notice: Subject to any disclaimer, the term of this patent is extended or adjusted under 35 U.S.C. 154(b) by 238 days.

This patent is subject to a terminal disclaimer.

(21) Appl. No.: 11/675,780

(22) Filed: Feb. 16, 2007

(65) Prior Publication Data

US 2007/0156772 A1 Jul. 5, 2007

Related U.S. Application Data

(63) Continuation of application No. 10/387,120, filed on Mar. 11, 2003, now Pat. No. 7,185,028.

(30) Foreign Application Priority Data

Mar. 12, 2002 (DE) .................. 102 11 606

(51) Int. Cl.
*G06F 17/30* (2006.01)
(52) U.S. Cl. .................. 707/7; 707/101; 707/102; 707/103 Y; 707/203; 707/205
(58) Field of Classification Search ........... 707/101, 707/102, 103 Y, 104.1, 7, 203, 205; 709/233; 370/493; 711/114
See application file for complete search history.

(56) References Cited

U.S. PATENT DOCUMENTS 4,020,466 A * 4/1977 Cordi et al. ............. 707/201
5,155,835 A * 10/1992 Belsan ..................... 711/114
5,403,639 A * 4/1995 Belsan et al. ............. 707/204
5,564,037 A   10/1996 Lam
6,449,655 B1 * 9/2002 Hann et al. ............... 709/233
6,792,429 B2  9/2004 Gilbert
6,934,725 B1  8/2005 Dings (Continued)

OTHER PUBLICATIONS

Andreas S. Weigend et al., "Expoiting Hierarchy in Text Categorization", SpringerLink Contemporary, 1999, pp. 193-216.*

(Continued)

*Primary Examiner*—Thuy N Pardo
(74) *Attorney, Agent, or Firm*—Sprinkle IP Law Group

(57) ABSTRACT

A data processing unit including a data network, a file server integrated into the data network and having a separate data memory for the server and wherein at least one primary data file system, in which data files stored on the server data memory are filed. The data files of the primary data file system are divided into at least two primary activity groups with a different hierarchical ranking by means of a primary hierarchical memory management in accordance with a primary activity criterion, that the memory management copies at least the data files of the primary activity group with a lowest ranking into at least one secondary data file system on a data memory of a data storage unit positioned subsequent to the server data memory and that the memory management generates metadata from the copied data files of the primary activity group with a lowest ranking.

31 Claims, 13 Drawing Sheets

U.S. PATENT DOCUMENTS 6,972,865 B1 * 12/2005 Muramatsu ................. 358/1.2
7,031,345 B1 * 4/2006 Haber ........................ 370/493
7,158,176 B2 1/2007 Tokkonen et al.

OTHER PUBLICATIONS

Scott Henninger, "An evolutionary Approach to Constructing Effective Software Reuse Repositories", ACM, Apr. 1997, pp. 111-140.*

* cited by examiner

DATA FILES SYSTEMS WITH HIERARCHICAL RANKING FOR DIFFERENT ACTIVITY GROUPS

CROSS REFERENCE TO RELATED APPLICATIONS

The present application is a continuation of U.S. patent application Ser. No. 10/387,120 entitled "Data Files Systems with Hierarchical Ranking for Different Activity Groups" filed Mar. 11, 2003, which claims priority to German application No. 102 11 606.7 filed Mar. 12, 2002, both of which are incorporated herein by reference in their entirety and for all purposes.

BACKGROUND OF THE INVENTION

The invention relates to a data processing unit comprising a data network, a file server integrated into the data network and having a server data memory and comprising at least one primary data file system, in which data files stored on the server data memory are filed.

Data processing units of this type are known from the state of the art. The problem is, however, that, on the one hand, the file servers are intended to ensure quick access to the data files but, on the other hand, an adequate security in the case of failures is intended to be present, and combined with this security in the case of failures the possibility of being able to access the data again as quickly as possible after any failure of a file server.

The object underlying the invention is, therefore, to improve the data processing unit of the type described at the outset with respect to its security in the case of failures and the access to the data files following any failure.

This object is accomplished in accordance with the invention, in a data processing unit of the type described at the outset, in that the data files of the primary data file system are divided into at least two primary activity groups with a different hierarchical ranking by means of a primary hierarchical memory management in accordance with a primary activity criterion, that the memory management copies at least the data files of the primary activity group with a lowest ranking into at least one secondary data file system on a data memory of a data storage unit positioned subsequent to the server data memory and that the memory management generates metadata from the copied data files of the primary activity group with a lowest ranking.

The advantage of the inventive solution is to be seen in the fact that due to the fact that the data files of the primary activity group with a lowest ranking are copied onto a secondary data file system, a data backup already takes place, on the one hand, and, on the other hand, simplified access to these data files is possible following failure of a file server due to the fact that only the metadata must be present on the server data memory in order to be able to access the data files.

Metadata within the meaning of this application are data which refer to the location of copies of an original data file and preferably have, in addition, data file attributes or data file descriptions, such as, for example, time stamps, of the original data file. With metadata the memory management has the possibility of finding the corresponding data file in its location.

The inventive solution is even more advantageous when data files of a primary activity group with a higher ranking are also copied onto the secondary data file system and when metadata are generated from these data files.

In principle, it is possible to keep the data files in the primary data file system in all the cases where the data files of the respective primary activity group are copied onto the secondary data file system and so direct access to the data files can be brought about with the operating system of the file server and, therefore, the data files copied to the secondary data file system represent a backup copy; on the other hand, the metadata do, however, ensure that B if it should be necessary B quick access to the data files copied to the secondary data file system is possible.

In principle, it would be conceivable to keep the data files of all the activity groups, from which metadata have been generated, in the primary data file system in order to make them available for quick access by the operating system.

This would, however, cause the capacity of the server data memory to increase very considerably.

In order to, therefore, keep the capacity of the server data memory within limits, one advantageous solution provides for the data files of the activity group with a lowest ranking, from which metadata have been generated, to be removed from the first data file system. This is possible since copies are present in the secondary data file system and it is possible to locate the data files via the metadata without any problem. As a result, it is possible to keep the capacity of the server data memory within limits.

It is, however, also conceivable to remove from the first data file system data files of the activity group with a higher ranking, from which metadata have been generated, in order to reduce the necessary memory capacity of the server data memory even more.

With respect to the design of the data memory for the secondary data file system, no further details have so far been given. One advantageous embodiment, for example, provides for the data memory to be formed by a first data storage medium of the post-positioned data storage unit.

With respect to the data management of the data files in the secondary data file system, no further details have likewise been given thus far. In principle, it would be possible to store the data files in the secondary data file system simply on the first storage medium.

In order to also improve the data integrity of the first storage medium which is intended to be preferably designed such that it allows as quick an access as possible to the data files, it is preferably provided for the data files to be divided in the secondary data file system on the post-positioned data storage unit into at least two secondary activity groups with different hierarchical rankings in accordance with a secondary activity criterion by means of a secondary hierarchical memory management, for metadata to be generated at least from the data files of the secondary activity group with the lowest ranking and the data files themselves to be filed on a second storage medium of the post-positioned data storage unit.

In principle, the data files of the secondary activity group can also be kept on the first storage medium in the secondary data file system even though they have been copied and metadata generated from them.

In order to create more memory space in the first storage medium, it is, however, particularly advantageous when, in the secondary data file system, at least the data files of the secondary activity group with a lowest ranking are removed from the first storage medium after their filing on the second storage medium and the formation of the metadata.

In order to ensure the data integrity as a whole in the secondary data file system, it is preferably provided for the data files of activity groups with a higher ranking to also be filed on the second storage medium in the secondary data file system and metadata generated. This has the advantage that even when the first storage medium fails it is still possible with the metadata to recover the data files from the second storage medium and so the second storage medium represents a backup copy for the first storage medium.

With respect to the difference between the first storage medium and the second storage medium of the post-positioned data storage unit, no further details have so far been given. One particularly preferred solution provides for the first storage medium to be a storage medium suitable for quick access to the data and the second storage medium to be a storage medium which is less expensive than the first storage medium and, in particular, to be suitable for the inexpensive mass storage of data files.

With respect to the recovery of information concerning the activities of the data files, no further details have so far been given. A particularly preferred solution provides for a filter system which records activities in the primary data file system in a file-related manner to be associated with the operating system of the file server.

In this respect, it is particularly favorable when the filter system includes the activities with respect to the data files in the primary data file system in a file-related manner.

As a result, it is possible for the filter system to transmit the activities to the primary hierarchical memory management for the formation of the primary activity groups.

It has not been excluded within the scope of the preceding embodiments that several secondary data file systems are also present.

A particular advantage of the inventive solution is that the metadata are built up such that in the case of several secondary data file systems each data file filed in them can be located in each of the secondary data file systems with the same metadata.

For this purpose, it is merely necessary for an additional base reference, which can be set manually or by a configuration in the operating system, to be present for each additional data file system.

In conjunction with the preceding description of the inventive solution, the security aspect which results due to the generation of the metadata has been emphasized, wherein this security aspect is present, in particular, when the metadata, for their part, are saved so that in the case of any failure of a server it is possible by using the saved metadata to facilitate quick access to all the data files, from which metadata have been generated, as a result of a small amount of data, namely only the metadata. In this respect, it is merely necessary to copy only the metadata on the storage medium of the file server, with which operations are intended to be restarted, which is quickly possible on account of the small amount of data and, therefore, access to the data files represented by the metadata is made possible again in the shortest possible time.

Such a copying or saving of the metadata can take place manually.

A particularly favorable solution does, however, provide for a metadata backup management which copies metadata from the server data memory onto an additional data memory.

In this respect, the metadata are preferably retained on the server data memory and only additional copies thereof are generated on the additional data memory.

With respect to the saving of the data files of the primary activity group, from which no metadata are generated, it is likewise possible to copy these onto an additional data memory by means of a user data backup management.

In addition or alternatively to the features of the data storage unit described above, a preferred solution of the object in the case of a data storage unit of the type described at the outset provides for at least some of the data files of the primary data file system to be copied on an additional data memory, for metadata to be generated from these data files and for the metadata to be filed on the server data memory in a metadata file system.

The advantage of this inventive solution is to be seen in the fact that the metadata are not filed in the primary data file system but rather in a metadata file system on the server data memory which is separate from the primary system.

This solution makes it considerably easier to copy the metadata and, therefore, the entire metadata file system onto additional data memories and, therefore, to provide the security function.

In this respect, it is not absolutely necessary with this inventive solution for a primary hierarchical memory management to be present in order to divide the data files of the primary data file system into activity groups. In principle, it would be possible to simply assume with this concept of the inventive solution that metadata are generated from all the data files of the primary data file system.

For reasons of a rational operation of the server data memory it is, however, advantageous when the division of the data files of the primary data file system into those, from which metadata are generated, and those, from which no metadata are generated, is brought about via a primary hierarchical memory management, in particular when it is also possible with it to remove some of the data files from the primary data file system and, therefore, not to allow the required memory capacity of the server data memory to become excessive.

In principle, it would also be conceivable with this inventive concept to copy the metadata file system manually. It is, however, particularly advantageous when the metadata file system is copied by a metadata backup management onto an additional data memory.

Such an additional data memory may be realized in the most varied of ways. One advantageous solution provides for the additional data memory to be a data memory of the post-positioned data storage unit.

A different advantageous solution provides for the additional data memory to be the first data storage medium of the post-positioned data storage unit.

Another solution provides for the additional data memory to be the server data memory of an additional file server.

Such an additional file server can either be a backup file server or a special file server which only serves to take over the operation of the actual file server quickly in the case of any failure of it.

Since the inventive concept explained above does not make a primary hierarchical memory management absolutely necessary but this is advantageously used, it is preferably provided, in accordance with this inventive concept, for the at least one section of the data files of the primary data file system to include the primary activity group with a lowest ranking which is generated by the primary hierarchical memory management.

An additional, advantageous inventive concept, which accomplishes the object set at the outset and can be used alternatively or in addition to the inventive solutions described above, provides in accordance with the invention, in a data processing unit of the type described at the outset and in the case of data files present on the primary data file system, of which data file copies are present on an additional data memory, for a user data backup management to continuously record alterations to the data files in the primary data file system and for the user data backup management to update the data file copies of the data files, which have undergone alterations, with respect to the alterations with a time delay determined by at least one update criterion.

This inventive solution has the advantage in comparison with the known standard backup methods, with which the data are saved, for example, daily or weekly, that a data backup is running continuously, preferably in the background, and it is therefore possible to save the data constantly to an adequate degree in the case of large amounts of data, wherein the advantage is to be seen in the fact that since the backup is constantly running in the background no separate period of time for a data backup is required which is, particularly in the case of large amounts of data, sometimes so great that it is no longer available during customary operating times of a data processing unit.

Furthermore, the inventive solution has the advantage that, particularly in the case of alterations carried out several times, each small alteration, which is subsequently corrected again, need not constantly be saved but rather that alterations repeatedly following quickly one after the one lead, in the long run, to the alteration carried out at the end being saved with the time delay. The time delay can, in this respect, be in the time range of minutes, hours or several hours.

The simplest possibility would be to determine the time delay as a defined parameter. It is, however, particularly advantageous when the time delay is dependent on several parameters, for example, on the effort required for the respective alteration or also on the relevance of the data file or also the work-load of the file server.

Proceeding from a minimum time delay, a particularly favorable solution provides for this to be alterable, in particular, increased in size in a variable manner, for example, in accordance with the predetermined parameters.

In order to keep the effort required for the user data backup management as small as possible, it is preferably provided for the user data backup management to record by means of an alteration filter only the data which have undergone alterations and so it is not necessary in the case of the user data backup management B as in the case of the known, customary backup systems B to check through all the data files for alterations but rather to already register the alterations by means of the alteration filter which interacts with the operating system of the file server. As a result, a considerable expenditure of time and operative effort can be saved during the ascertainment of the alterations.

Furthermore, it is of advantage, in particular, when the alterations are being carried out, when the user data backup management accesses with a data file update system only the data file copies of the data files which have undergone alterations and carries out the alterations in it so that in this case, as well, it is not necessary to check through all the data file copies.

With respect to the filing of the data file copies, no further details have so far been given. It is, for example, particularly advantageous when the data file copies are present in the post-positioned data storage unit.

In this respect, it is particularly favorable when the data file copies are present in the secondary data file system of the post-positioned storage unit.

In this respect, the data file copies can be present either on the first storage medium or the second storage medium of the post-positioned data storage unit, depending on whether the post-positioned data storage unit operates, in addition, with a secondary hierarchical memory management.

It has been assumed for the explanation of the present invention that data file copies already exist for the data files of the first data file system.

Data file copies of this type can, in principle, be generated in the most varied of ways.

One particularly advantageous solution provides for the data file copies to be made by generating metadata so that in addition to each data file copy metadata also exist which are likewise preferably filed on the server data memory.

One particularly favorable solution provides for the data files of the primary data file system to be managed by a primary hierarchical memory management which leaves some of the data files in the first data file system but, nevertheless, generates data file copies and metadata and generates data file copies of a different section of the data files but removes these from the first data file system.

As soon as the alteration in a data file, which has been removed from the primary data file system, has, however, taken place, this presupposes that this data file is copied back first of all to the primary data file system again so that following the alteration the data file is, first of all, present on the primary data file system again and the metadata present refer to the data file copy which has not yet been altered. The inventive user data backup management now leads to an update of the data file copies accessible via the metadata, proceeding from the data file present in the primary data file system, likewise with the inventive time delay and, subsequently, to an update of the metadata, as well.

In conjunction with the inventive concept of the continuous updating of the user data by the user data backup management, as described above, no details have been given concerning the updating of the metadata.

One particularly advantageous inventive concept provides with respect to the metadata for a metadata backup management to continuously detect alterations in the metadata in the primary metadata file system in the case of the metadata, which are present on the primary metadata file system and of which copies are present on an additional data memory, and for the metadata backup management to update the copies of the metadata, which have undergone alterations, with respect to these alterations with a time delay determined by at least one update criterion.

The advantage of this inventive concept is to be seen in the fact that the alterations in the metadata in the primary metadata file system are constantly detected and proceeding from the detection of these alterations the copies of the metadata are updated with a predetermined time delay. This has, with respect to the metadata, the same advantages as those which have been explained in conjunction with the user data backup management for the user data.

The time delay can also be constant in the case of the metadata. It is, however, even more advantageous when the time delay is variable and dependent on specific marginal conditions for the updating of the metadata, such as, for example, the effort required for the updating of the metadata and the work-load of the filer server or similar parameters.

In this case, it is also particularly favorable when a minimum time delay is specified, from which the deviations can then take place due to variable parameters.

In order to also reduce the effort required with respect to the recording of the alterations in the metadata, it is preferably provided for the metadata backup management to record by means of an alteration filter only those metadata which have undergone alterations so that no checking through of the entire metadata for alterations is required.

Furthermore, the effort required for the updating of the metadata may be reduced in that the metadata backup management accesses with a data file update system only the copied metadata, the metadata of which have undergone alterations, and carries out the alterations in them.

In order to have as quick an availability as possible of the data processing system following any malfunction of a file server, one preferred solution provides for access to the data files, for which metadata have been generated, to be brought about in the case of any malfunction of the file server first of all by making the metadata available on the primary data file system of the file server used.

The file server used can be the malfunctioning file server when this has been repaired quickly enough and so the metadata used, for example, from an additional data memory are copied back again which can be brought about very quickly in the case of metadata since the metadata form, even for large amounts of data files, a very small amount of data which may be copied onto a server data memory relatively quickly.

It is, however, also conceivable for the file server used to be a backup server or a file server provided especially for this purpose which takes over the function of the actual file server in the case of the failure or malfunction thereof and onto which the metadata can then either be copied quickly or are already available as copies.

Since the operation of a file server used only with metadata does not allow quick access to the data files but rather this always takes place with delays, it is preferably provided for the continuation of operations, once operation of the file server used has started with metadata, to be brought about by copying data files onto the primary data file system of the server used in accordance with a priority sequence determined from the metadata.

Additional features and advantages of the inventive solution are the subject matter of the following detailed description as well as the drawings illustrating several embodiments of an inventive data processing unit.

DETAILED DESCRIPTION OF THE INVENTION

Figure 1:
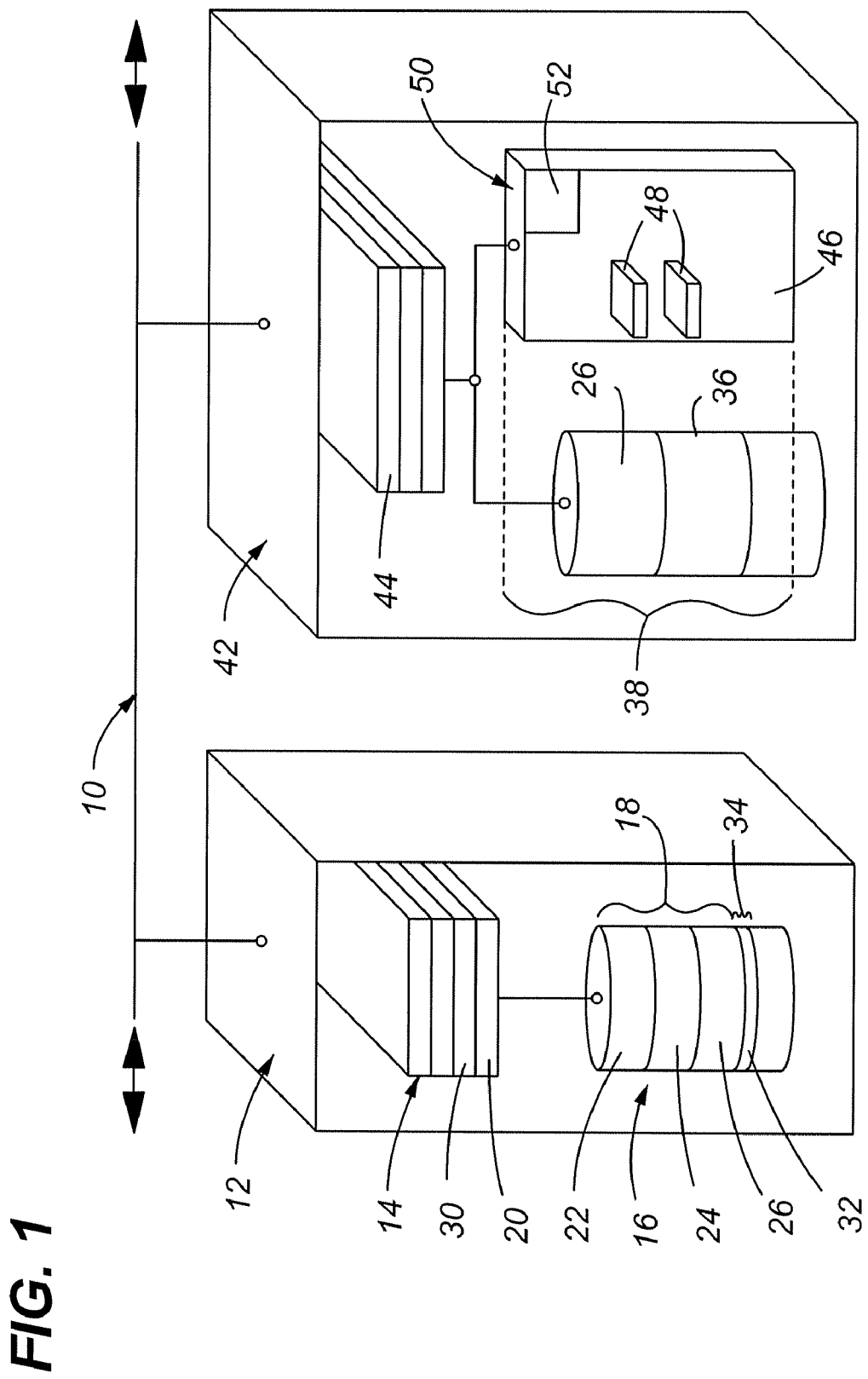
FIG. 1 shows a schematic view of a first embodiment of an inventive data processing unit with a file server, the primary data file system of which is organized by a primary hierarchical memory management.

A first embodiment of an inventive data processing unit, illustrated in FIG. 1, comprises a data network which is designated as a whole as 10 and with which a file server 12 is connected.

The file server 12 is, for its part, provided with an operating system 14 and a server data memory 16, in which data files with user data for the data storage unit can be stored.

The data files with the user data are thereby stored in a primary data file system 18 on the server data memory 16.

In order to not allow the number of data files in the primary data file system 18 to increase excessively and therefore keep the capacity of the server data memory 16 within a justifiable scope, a primary hierarchical memory management 20 is associated with the primary data file system 18 and this divides the data files of the primary data file system 18 into, for example, three activity groups 22, 24 and 26, namely according to a primary activity criterion which is measured, for example, by how long ago the respective data file was last accessed. Other activity criteria can be data file name, user, access frequency, alone or in combination with one another.

For this purpose, a filter system 30 is associated with the operating system 14 and this records accessing of the data files in the primary data file system 18 and passes this to the primary hierarchical memory management 20 so that this divides, for example, the primary data file system 18 into the activity group 22 with a highest ranking, i.e., with access the shortest time ago, the activity group 24 with a lower ranking, i.e., with access a longer time ago and the activity group 26 with a lowest ranking, i.e., with access the longest time ago.

Since it is to be assumed in the case of the activity group 26 with the lowest ranking that a current access to these data files on the part of the operating system 14 will take place with only little probability, primary metadata 32 are generated for these data files and filed in a metadata file system 34 on the server data memory 16. In addition, the data files of the activity group 26 are filed in a secondary data file system 38 on a first storage medium 36 of a data storage unit, which is designated as a whole as 42 and post-positioned, prior to the generation of the metadata 32. This post-positioned data storage unit 42 is, for example, likewise connected via the data network 10 to the file server 12 and comprises, for its part, its own operating system 44, wherein a filing of data files in the first storage medium 36 or a second storage medium 46 can be organized with this operating system 44.

The first storage medium 38 is preferably a data memory operating very quickly, for example, a so-called hard disk or a data memory comparable to this with respect to the operating speed and the second storage medium 46 is preferably designed as a storage medium which is less expensive than the first storage medium 36 and, therefore, forms the possibility of an inexpensive mass storage of data files. For example, the second storage medium 46 is formed by a plurality of data carrier cassettes 48 which operate with the most varied of data carriers, such as, for example, tapes or disks, wherein these data carrier cassettes 48 are managed by an archive system 50 and access to the data carrier cassettes is brought about via read-write units 52.

A construction of a post-positioned data storage unit 42 with a first storage medium 36 and a second storage medium 46 is described, for example, in German patent application No. 198 11 034.

As a result of the fact that primary metadata 32 have been generated from the data files of the activity group 26 and the data files 26 have been transferred to the secondary data file system 38 of the post-positioned data storage unit 42, the required memory capacity of the server data memory 16 is reduced since the data files of the activity group 26 can be removed in the primary data file system 18 and are now represented only by the primary metadata 32 stored on the server data memory 16.

The primary metadata 32 are managed under the same data file names as the individual data files of the activity group 26 and comprise, in addition, a reference to the secondary data file system 38, in which the data files of the activity group 26 are now filed.

The metadata for one data file preferably comprise all the relevant data for describing the data file with the exception of the actual user data. The metadata also comprise, in particular, information concerning the time of the last access to the actual data file.

If the operating system 14 is now intended to access one of the data files of the activity group 26, the operating system 14 is stopped and the memory management 20 finds in the metadata 32 corresponding to the respective data file the reference to the data file in the secondary data file system 38 in the post-positioned data storage unit 42. With this reference, the requested data file is copied by the memory management 20 from the secondary data file system 38 onto the primary data file system 18 again and can then be made available to the operating system 14 for access.

Figure 2:
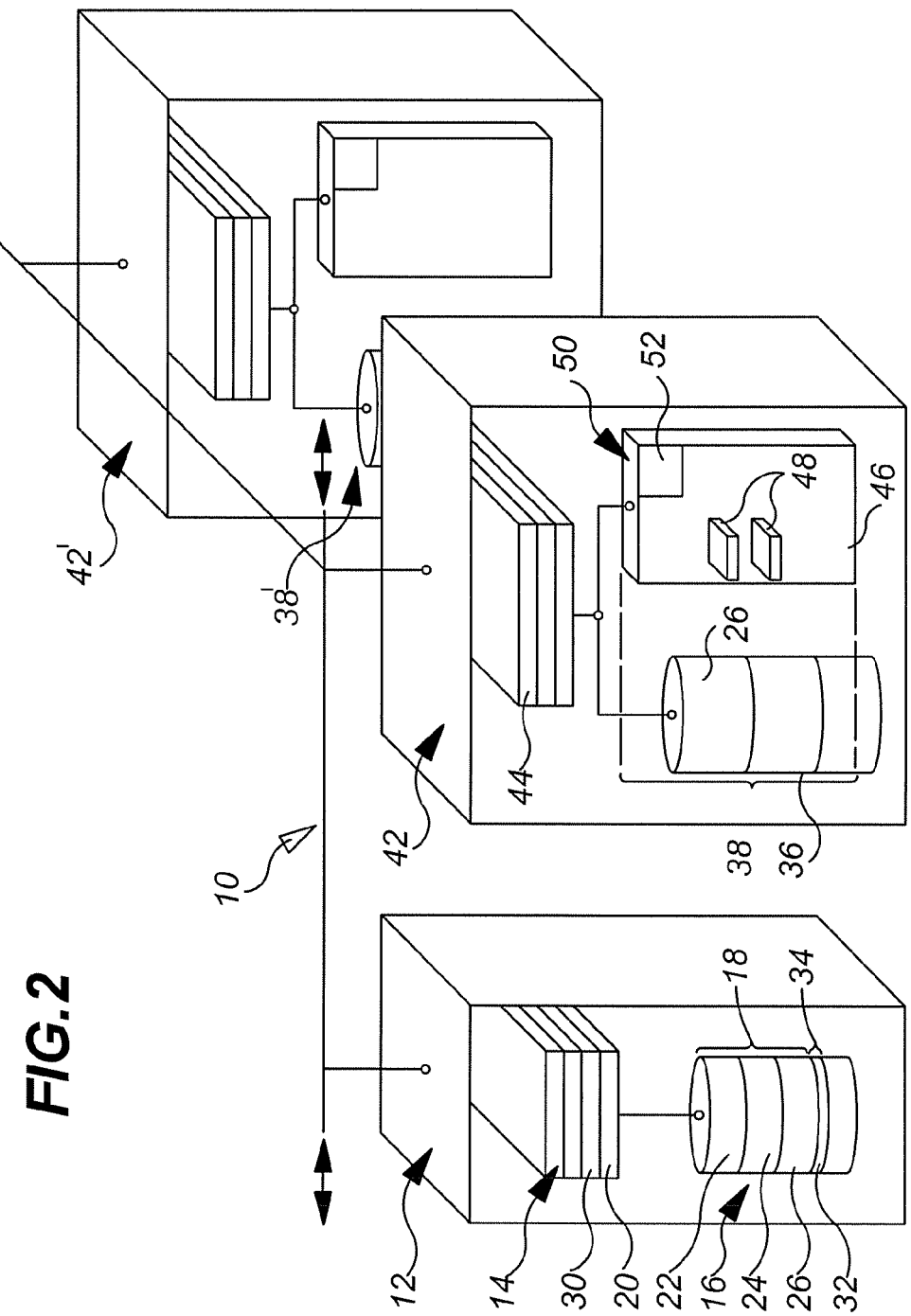
FIG. 2 shows a second embodiment of an inventive data processing unit in accordance with the first embodiment but with the difference that several data storage units which are post-positioned are provided.

As a result of the fact that the data files of the activity group 26 are stored in the post-positioned data storage unit 42 in the form of the secondary data file system 38, it is also possible, for example,—as illustrated in FIG. 2 in the case of the second embodiment of an inventive data storage unit B to provide, for reasons of redundancy, an additional secondary data file system 38' or even several secondary data file systems, in which the same data files are filed again for security reasons, wherein the same metadata 32 can be used in order to be able to locate the data files in each of the secondary data file systems 38. However, in the case of one additional secondary data file system 38' or several secondary data file systems 38' a basic reference is required per additional secondary data file system 38' which can be input either manually or into the configuration of the operating system so that when the secondary data file system used first of all is not available a manual or technical software switchover to an additional secondary data file system 38' takes place.

Figure 3:
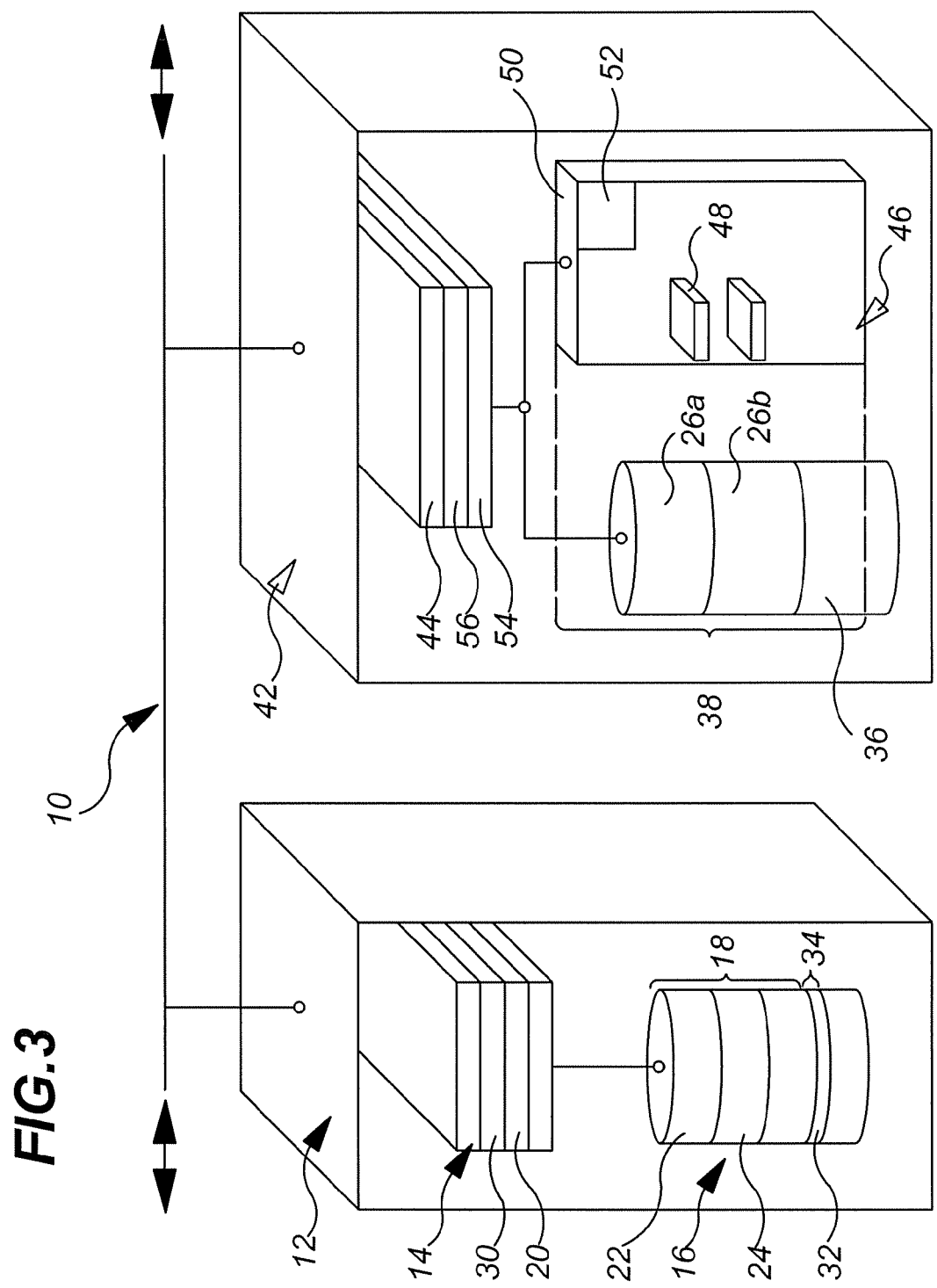
FIG. 3 shows a third embodiment of an inventive data processing unit, with which not only the primary data file system of the file server is organized by a primary hierarchical memory management but a secondary data file system of the data storage unit which is post-positioned is organized by a secondary hierarchical memory management.

So that the memory capacity of the first storage medium 36 can also be kept within limits, a secondary hierarchical memory management 54 is, as illustrated in FIG. 3 for a third embodiment, associated with the operating system 44 in the post-positioned data storage unit 42 and this divides the data files in the secondary data file system 38 into activity groups, for example, into secondary activity groups 26a and 26b in accordance with a secondary activity criterion, wherein the secondary activity group 26b has the lowest ranking.

The activity criterion used by the secondary hierarchical memory management 54 is also ascertained via a secondary filter system 56 which registers at least one activity criterion of the data files of the activity group 26 and subsequently subdivides the data files of the activity group 26 whether or not this activity criterion is present.

Figure 4:
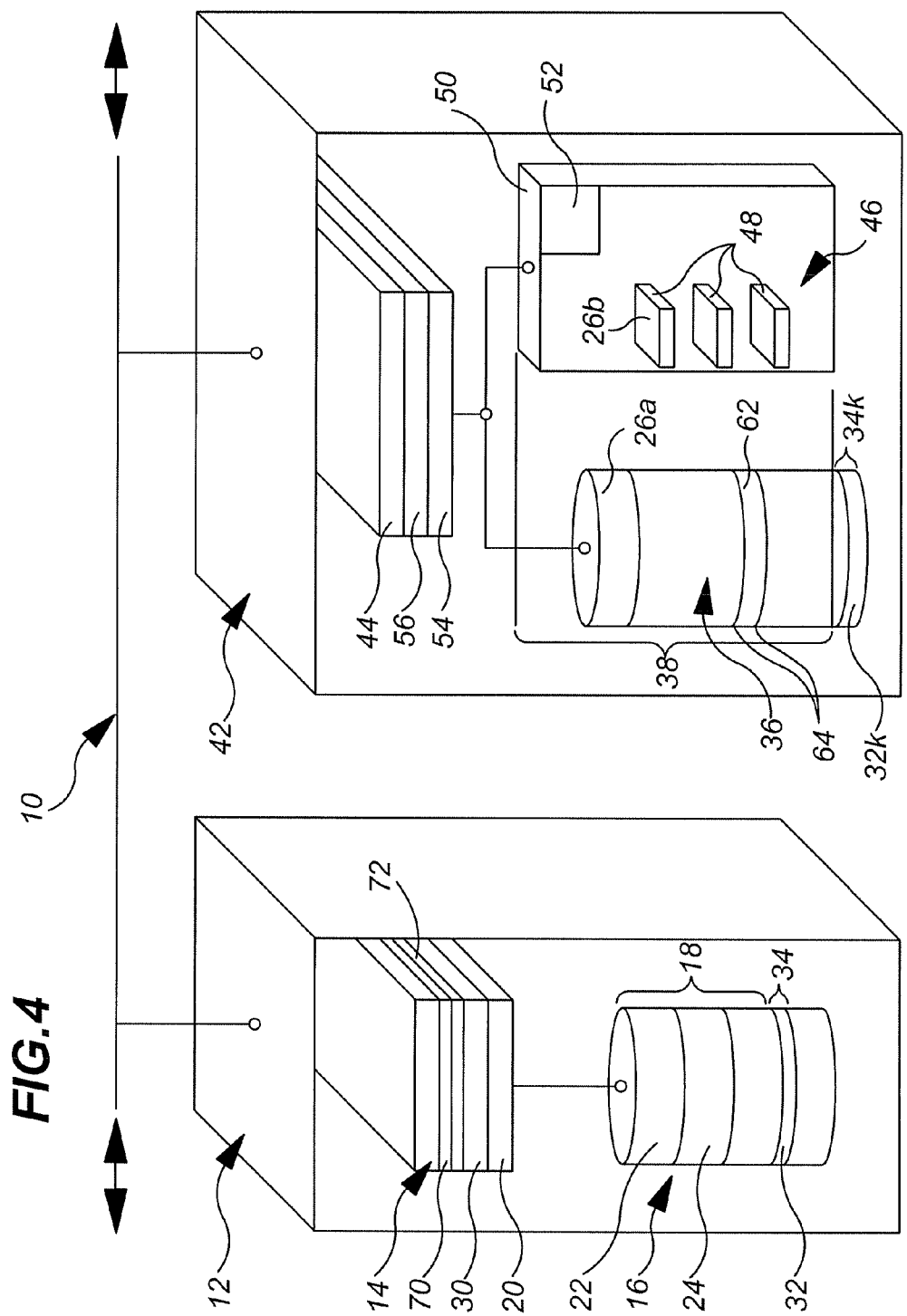
FIG. 4 shows an illustration of the third embodiment according to FIG. 3 with illustration of a division of the data files of the secondary data file system to a first storage medium and a second storage medium.

As illustrated in FIG. 4, on account of the division of the data files 26 into the secondary activity group 26a with a highest ranking and the secondary activity group 26b with a lowest ranking it is possible to generate secondary metadata 62 for the data files of the secondary activity group 26b with a lowest ranking by means of the secondary hierarchical memory management 54 and to store the data files of the secondary activity group 26b with a lowest ranking on the second storage medium 46, for example, on one or more data carrier cassettes 48, wherein the secondary metadata 62 represent a reference to the filing of the data files from the secondary activity group 26b on the second storage medium 46.

In the simplest case, the secondary metadata 62 are still filed in this case in the secondary data file system 38 and also the data files stored on the data carrier cassettes 48 belong logically to the secondary data file system 38.

The generation of the secondary metadata 62 therefore serves merely to keep the capacity of the first storage medium 36 as small as possible since the secondary metadata 62 require less memory capacity than, for example, the data files of the secondary activity group 26b.

It would, however, also be conceivable to file the secondary metadata 62 in a secondary metadata file system 64 on the first storage medium 36.

Furthermore, it is likewise conceivable to generate metadata from secondary activity groups with higher rankings, i.e., for example, also from the secondary activity group 26a with the highest ranking and to file the data files themselves on the data carrier cassettes 48 in the second storage medium 46.

In order to make provision for the case where a crash occurs in the server data memory 16 or the server data memory 16 fails for other reasons and, therefore, all the data files themselves are not available, a metadata backup management 70 and a user data backup management 72 which serves the purpose of saving the data files still present on the server data memory 16 are associated with the operating system 14 of the file server 12 in a fourth embodiment of an inventive data processing unit, as illustrated in FIG. 4.

The metadata backup management 70 operates, for example, with respect to the primary metadata 32 such that it copies the entire metadata file system 34 as such onto the first storage medium 36 and so the copied data files 32k of the metadata 32 are present on the first storage medium 36 in a copied metadata file system 34k.

Figure 5:
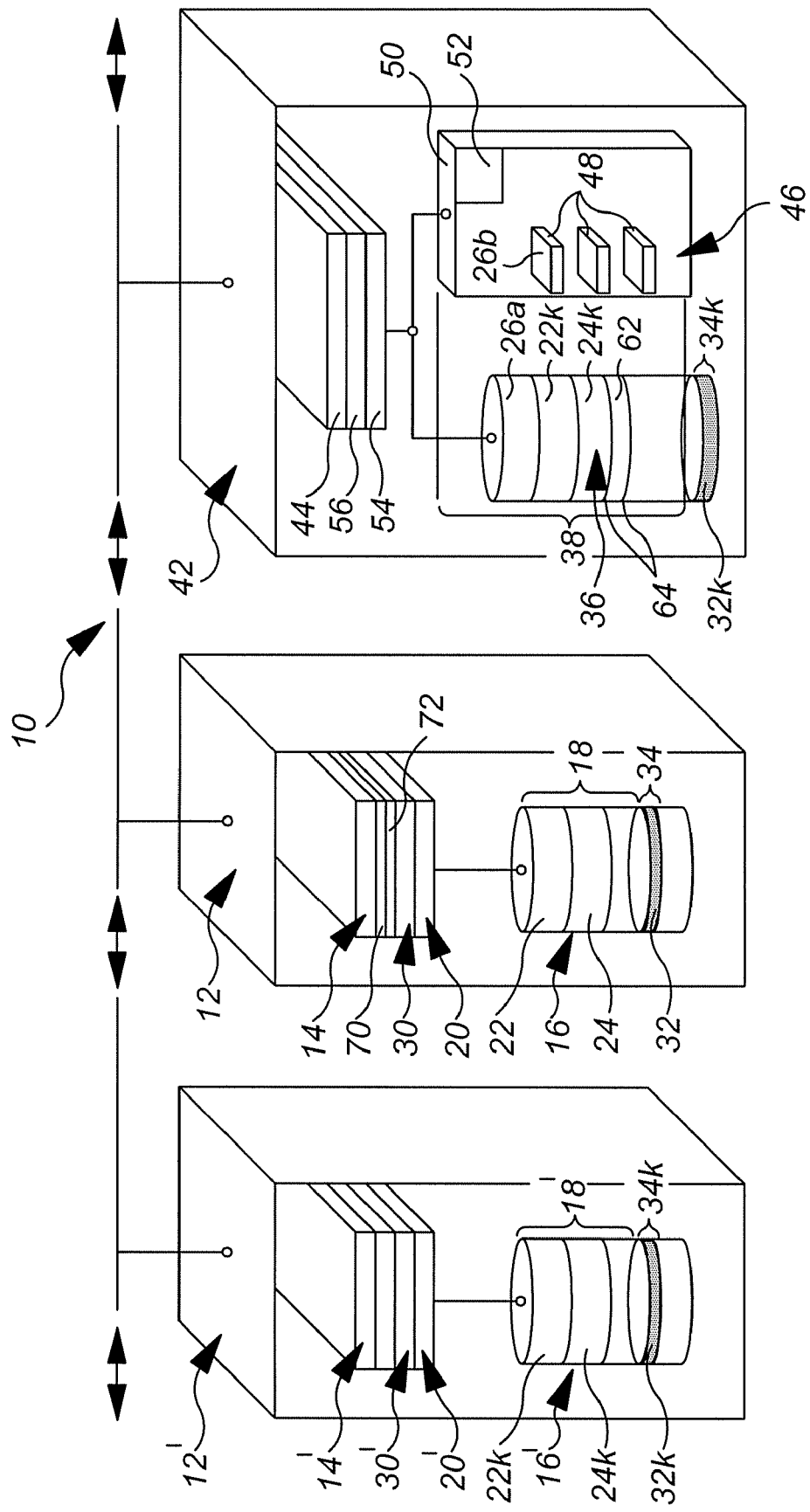
FIG. 5 shows a fourth embodiment of an inventive data processing unit which is based on the first embodiment and has, in addition to the file server, a backup file server, as well.

As a result, it is possible at any time, by accessing the copied metadata file system 32k of the post-positioned data storage unit 42, to load this onto a repaired server data memory 16 or a backup server data memory 16' of a backup file server 12' again which can, in principle, be of an identical design to the file server 12 and in the case of a crash of the server data memory 16 can take over the tasks of the file server 12, as illustrated in FIG. 5.

In addition, the user data backup management 72 preferably carries out a data backup with respect to the data files of the primary activity groups 22 and 24, as well, since these could also no longer be used in the case of a crash of the server data memory 16.

The user data backup management 72 therefore copies all the data files of the primary activity groups 22 and 24 of the primary data file system into the secondary data file system 38 so that the data files of the primary activity groups 22 and 24 are present in it as copied data files of the copied activity groups 22*k* and 24*k*.

As illustrated in FIG. 5, it is therefore possible in the case of a crash of the server data memory 16 to also transfer the copied data files 22*k* and 24*k* of the copied activity groups 22*k* and 24*k* to the backup server data memory 16' of the backup file server 12' and, therefore, to have the possibility of using the backup file server 12' as a complete substitute for the file server 12 since not only the data files of the copied activity groups 22*k* and 24*k* are present on its backup server data memory 16' but also the data files of the metadata as copied metadata 32*k* in the metadata file system 34*k*.

Figure 6:
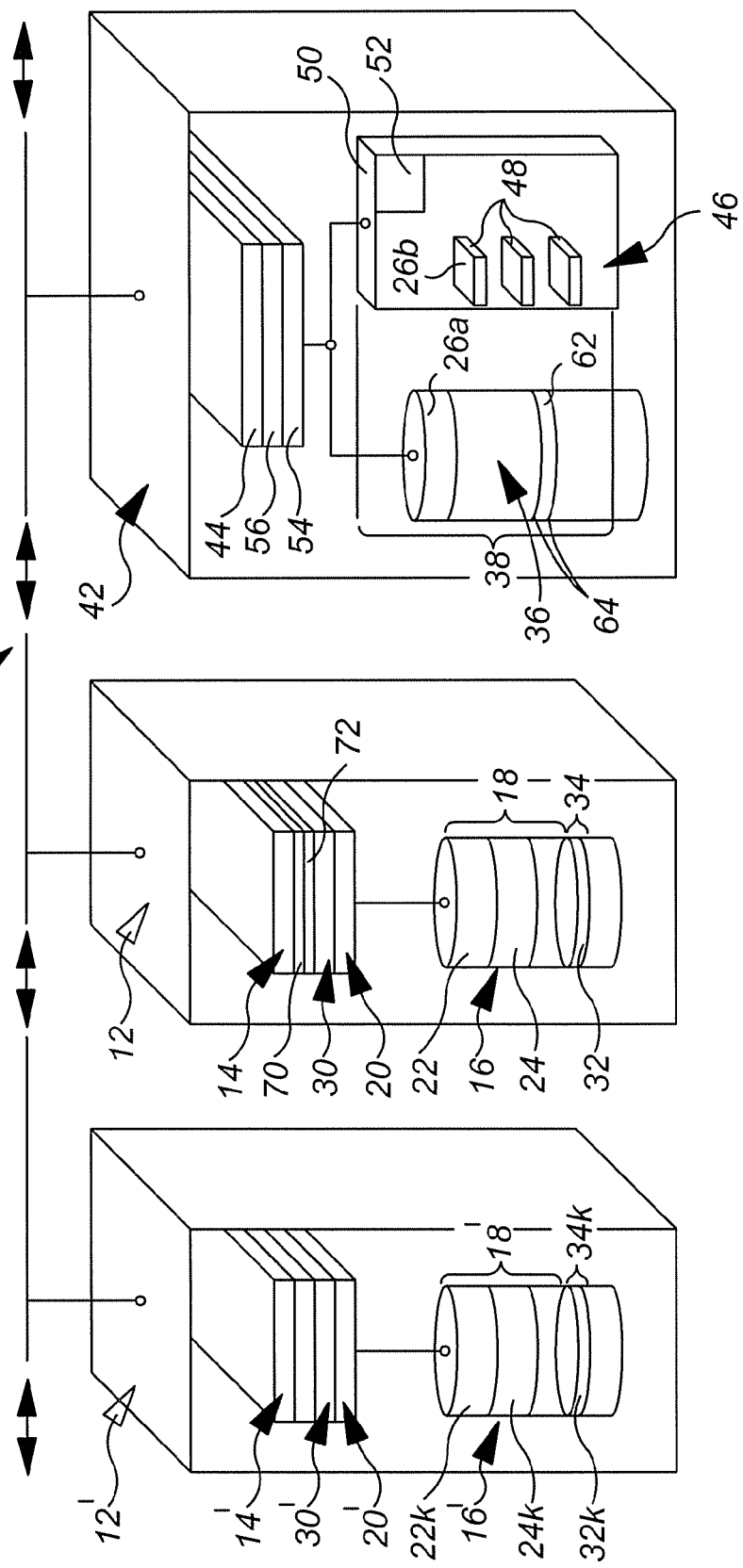
FIG. 6 shows a fifth embodiment which is based on the fourth embodiment with respect to its fundamental construction but the backup function is undertaken via the backup server.

Alternatively thereto, it is, however, also possible, as illustrated in a fifth embodiment of the inventive data processing unit in FIG. 6, to file the copied metadata 32*k* in the copied metadata file system 34*k* and the copied data files 22*k* and 24*k* of the activity groups 22 and 24 directly on the backup server data memory 16 when using the backup file server 12' so that any copying and storing of the same in the post-positioned data storage unit 42 is not absolutely necessary or can be carried out only for the purpose of an additional backup.

In the case of the functions of the metadata backup management 70 and the user data backup management 72 described in conjunction with FIGS. 5 and 6, it is assumed that B as known from the state of the art B a backup copy is made and stored at specific time intervals, i.e., for example, at the end of each day or at the end of each week.

The making and storing of backup copies is, however, very time-consuming in the case of large amounts of data.

Figure 7:
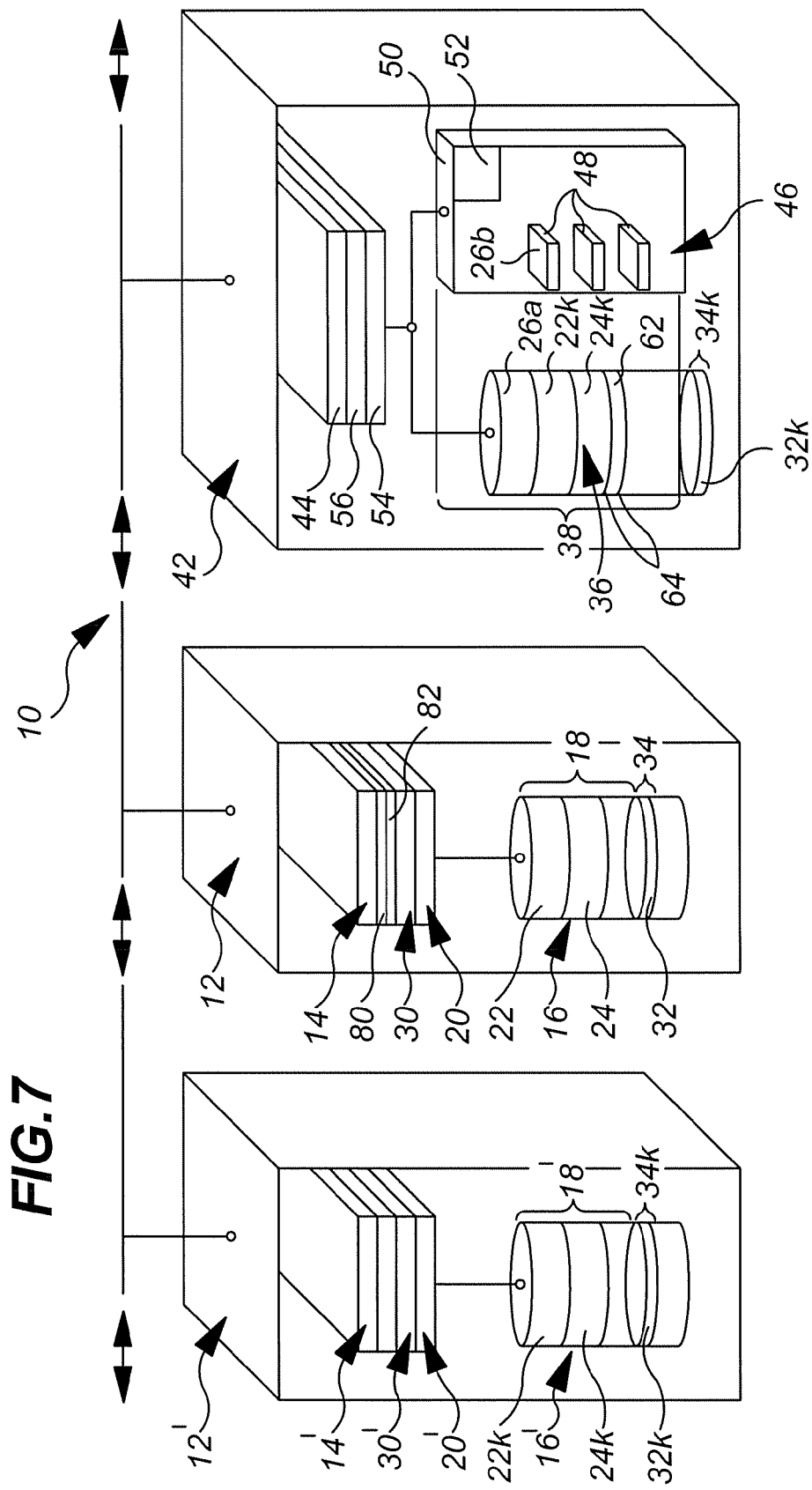
FIG. 7 shows a sixth embodiment of an inventive data processing unit with a metadata backup management and user data backup management operating constantly.
Figure 8:
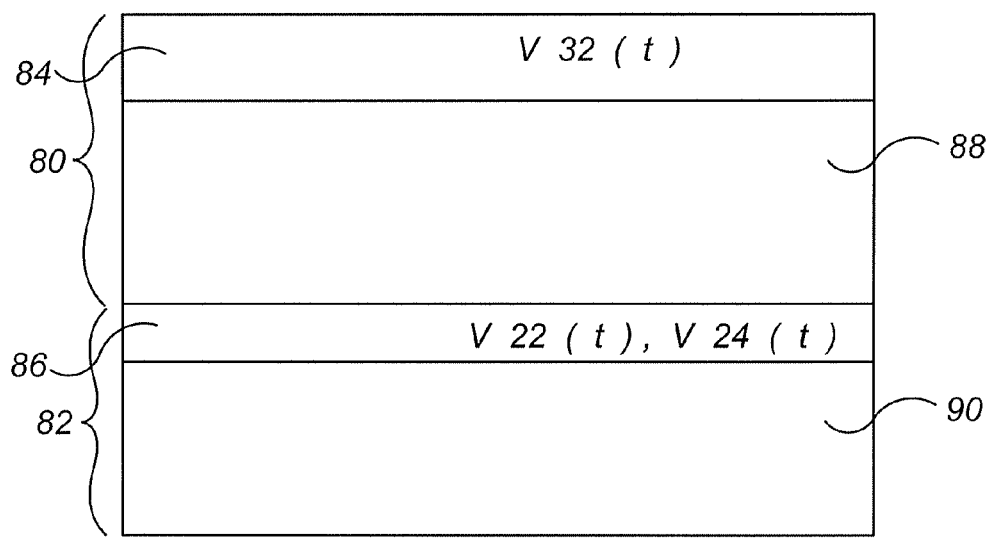
FIG. 8 shows a schematic illustration of functional blocks of the metadata backup management and the user data backup management.
Figure 9:
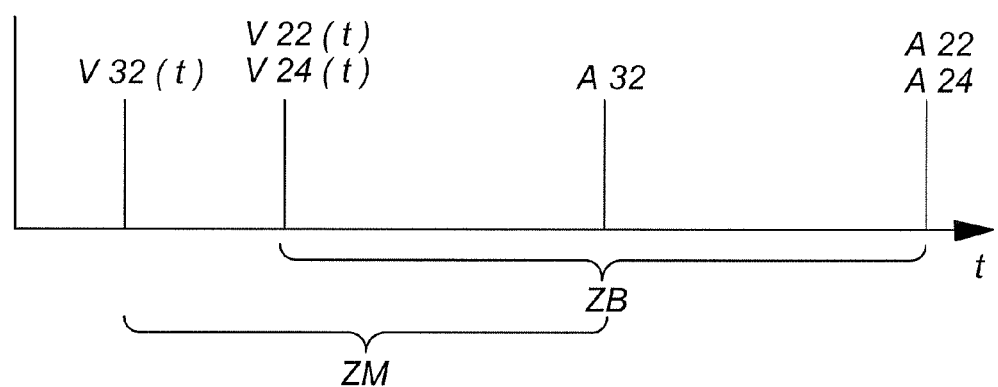
FIG. 9 shows a schematic illustration of the time delay provided by the metadata backup management and by the user data backup management for the updating of data file copies.

For this reason, in a sixth embodiment of an inventive data processing unit an improved embodiment of a metadata backup management 80 illustrated in FIGS. 7 to 9 provides for this to determine each time with an alteration filter 84 associated with the operating system 14 whether a data file of the metadata 32 has undergone an alteration or not during access to it.

If the data file of the metadata 32 has not undergone any alteration, the alteration filter 84 ignores the access to the data file of the metadata 32 but if the data file of the metadata 32 has undergone an alteration, the alteration filter 84 registers this alteration, designated as V32(*t*), of the data file of the metadata 32 as a function of the time t, i.e., as a function of the time, at which the alteration has taken place.

The alteration filter 86 of the user data backup management 82 operates in the same way, i.e., if access to one of the data files in the primary data file system 18, for example, a data file of the primary activity groups 22 or 24 or the activity group 26 does not lead to any alteration in the data file itself, the alteration filter 86 remains inactive. If, however, an alteration in a data file takes place, the alteration filter 86 registers this alteration V22(*t*) or V24(*t*) of the respective data file as a function of the time t, i.e., as a function of the time, at which this alteration has taken place, wherein in the case of a data file of one of the activity groups 22, 24 the data file is present from the beginning on the primary data file system 18 whereas in the case of an alteration in a data file present only in the secondary data file system 38, this data file is copied onto the primary data file system 18 and is, therefore, likewise present on the primary data file system 18 following the alteration.

The alterations in the data files ascertained by the respective alteration filters 84 and 86 are now transferred to a respective data file update system 88 or 90 of the respective metadata backup management 80 or user data backup management 82 (FIG. 8) and this data file update system 88 and 90, respectively, now causes, as illustrated in FIG. 9, an update A 32 or A 22 or A 24 only of the data file in the secondary data file system 38 corresponding to the altered data file but not immediately after the alteration filter 84 and 86, respectively, has ascertained the alteration V32(*t*) or V22(*t*), V24(*t*) but rather with a time delay which can be specified to the respective data file update system 88 and 90, respectively, wherein a time delay ZM for the updating of data files of metadata 32 need not correspond to the time delay ZB for the updating of data files of user data from the primary activity groups 22 or 24 but can be entirely different.

It is even possible, in the case of the data file update system 90 for the user data, to differentiate between the time delay ZB for data files from the primary activity group 22 and data files from the primary activity group 24 or data files from the activity group 26 and, therefore, to select the time delay ZB differently depending on the primary activity group 22, 24, 26, in which the data files are filed.

Such an inventive metadata backup management 80 and user data backup management 82 is preferably operated as well during the ongoing operation of the file server 12 so that a continuous updating of the copied data files in the copied metadata 32*k* and the data files in the copied primary activity groups 22*k* or 24*k* is brought about but not immediately following any alteration but rather with a certain delay. This creates the possibility of reducing the effort required in the case of the inventive metadata backup management 80 and user data backup management 82, particularly when several alterations are carried out in quick succession. In this case, alterations following one another repeatedly at short intervals are not taken into account during the update on account of the time delay ZM and ZB but rather only the alteration in the respective data file, which remains in existence for a period of time which is greater than ZM or ZB, is taken into account.

In addition to the reduction in the management effort required, this solution also has the advantage that the user has, with it, the possibility of, where applicable, reconstructing a previous state of the data file from a data file of the copied metadata 32*k* or a data file of the copied primary activity groups 22*k* or 24*k*.

Figure 10:
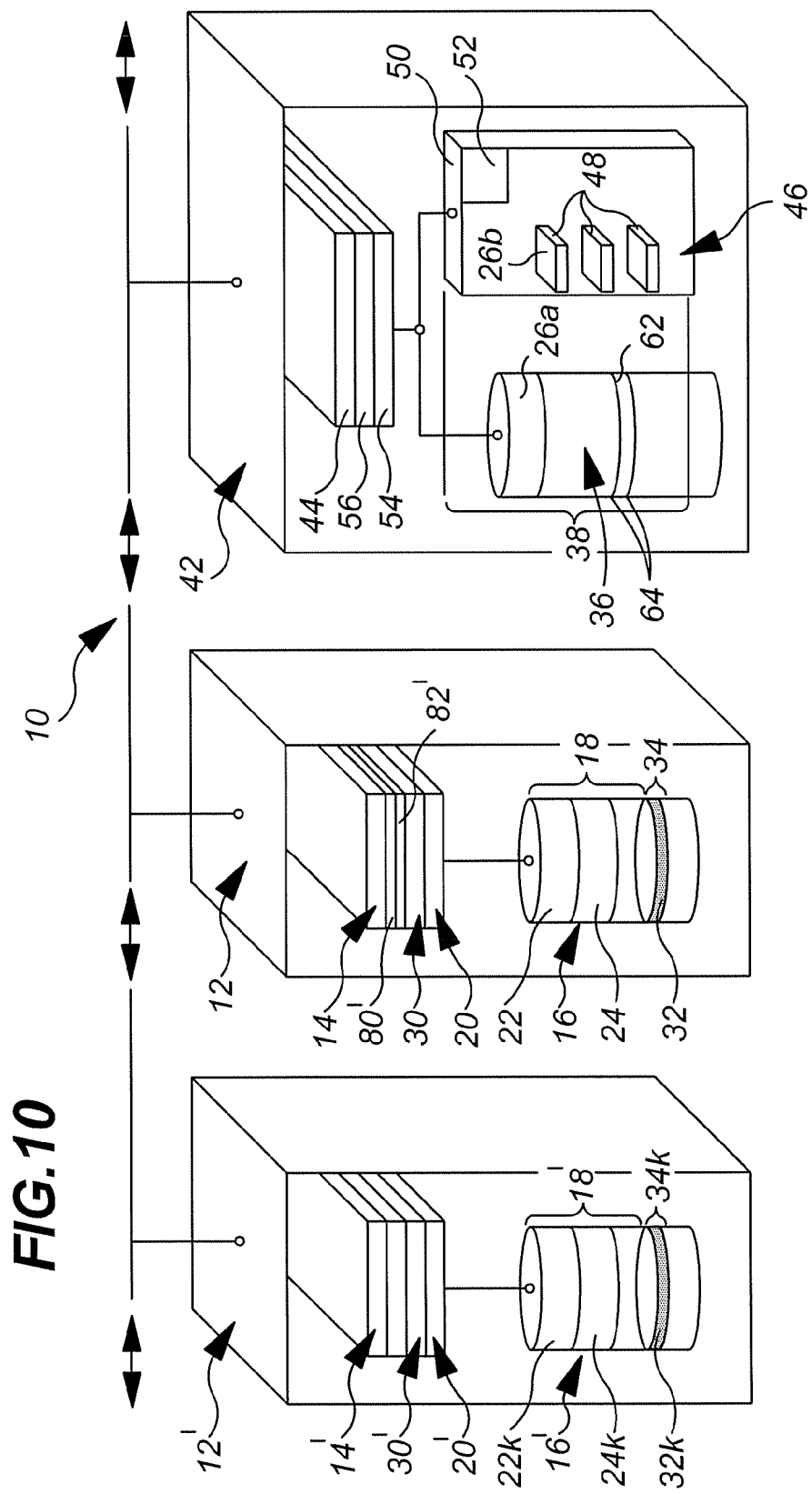
FIG. 10 shows a seventh embodiment of an inventive data processing unit which is based on the principle shown in the sixth embodiment and operates with a metadata backup management and a user data backup management.

In the same way as that described in conjunction with FIGS. 7 to 9, the inventive metadata backup management 80' and user data backup management 82' can, in a seventh embodiment of an inventive data processing unit, carry out a backup management in the case of data files of copied metadata 32*k* present on the backup server 12' and data files of copied primary activity groups 22*k* and 24*k* so that the backup of the data files on the server data memory 16 is not brought about via the post-positioned data storage unit 42 but rather primarily via the backup server 12' (FIG. 10).

Figure 11:
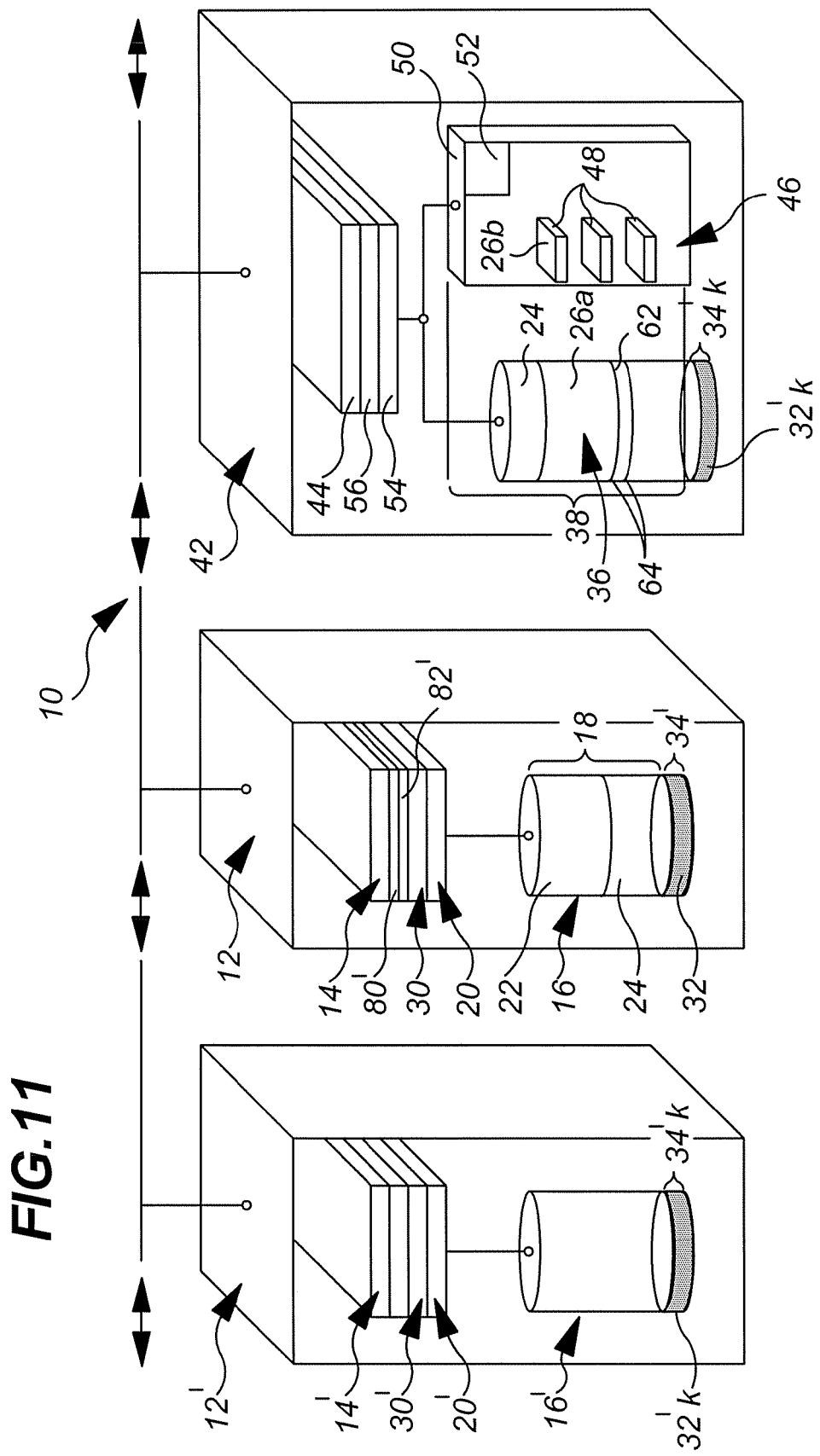
FIG. 11 shows an eighth embodiment of an inventive data processing unit, with which operation of the backup file server is started with metadata following a malfunctioning of the file server.

In an eighth advantageous embodiment of an inventive data processing unit, illustrated in FIG. 11, the activity criterion of the primary hierarchical memory management 20 is selected such that the data files in the activity group 22 with the highest ranking remain in it only for the shortest possible time, for example, fractions of seconds or minutes and are then incorporated into one of the activity groups 24 or 26 with a lower ranking.

The data files of both activity groups 24 and 26 are transferred to the secondary data file system 38 and the metadata 32' are then generated from the data files of the two activity groups 24 and 26 and filed in the metadata file system 34'.

However, the data files of the activity group 24 are not removed from the primary data file system 18 but rather remain present on the primary data file system 18 since these are current data files, to which constant access on the part of the operating system 14 takes place. Only the data files of the activity group 26 are removed from the primary data file system 18, as already described in conjunction with FIGS. 1 and 2.

Furthermore, the metadata 32' are filed on the backup file server 12' as copy 32'k as metadata file system 34'k.

As an additional security measure, it is, however, also possible to file a second copy of the metadata 32' as 32'k and of the metadata file system 34'k on the first storage medium 36 of the post-positioned data storage unit designated as 42.

In this embodiment, the metadata backup management 80' operates in the manner which has already been described.

On the other hand, the user data backup management 82' operates such that in the case of any alteration in a data file from the activity group 24 in the primary data file system 18 an update of the data file of the activity group 24 in the secondary data file system 38, which can be located by means of a data file of the metadata 32', is likewise brought about with a predeterminable time delay ZB. If the updating of the data file of the activity group 24 in the secondary data file system 38 has been brought about, an adjustment of the corresponding data file of the metadata 32' then takes place and, subsequently, an adjustment of the corresponding data file in the copied metadata 32'k by the metadata backup management 80' not only on the backup server data memory 16' but also on the storage medium 36 of the post-positioned data storage unit 42.

If a data file of the activity group 26 is altered, the corresponding data file is again filed in the server data memory 16 via the metadata 32' and, as a result, the update of the copied data file in the activity group 26 in the secondary data file system 38 takes place automatically in comparison with a data file of the activity group 22 or 24 and following alteration thereof B as already described in conjunction with a data file of the activity group 24 B with the corresponding time delay ZB and, following updating of the corresponding copied data file, the updating of the copied metadata 32'k by the metadata backup management 80'.

If, in this embodiment, a crash occurs in the server data memory 16, it is accepted that data files of the activity group 22 will be lost. Since all the new data files have, however, been allocated to the activity group 24 or the activity group 26 after a very short time, this loss is slight and can be accepted without any problem.

As a result of the fact that the backup server 12' is, however, in possession of the copied metadata 32'k for the data files of the primary activity groups 24 and 26, the backup server 12' can, apart from the data files of the activity group 22, make available all the remaining data files of the primary activity groups 24 and 26 to the operating system 14' but with a certain delay in time since the corresponding data file must first of all be retrieved from the secondary data file system 38 via the metadata 32'k on the backup server 12'.

This system does, however, have the advantage that restarting of the data storage unit is possible very quickly since it is possible to make available again to the operating system 14' via the backup server 12 in the shortest possible time the data files from the activity groups 24 and 26 requested by it.

Figure 12:
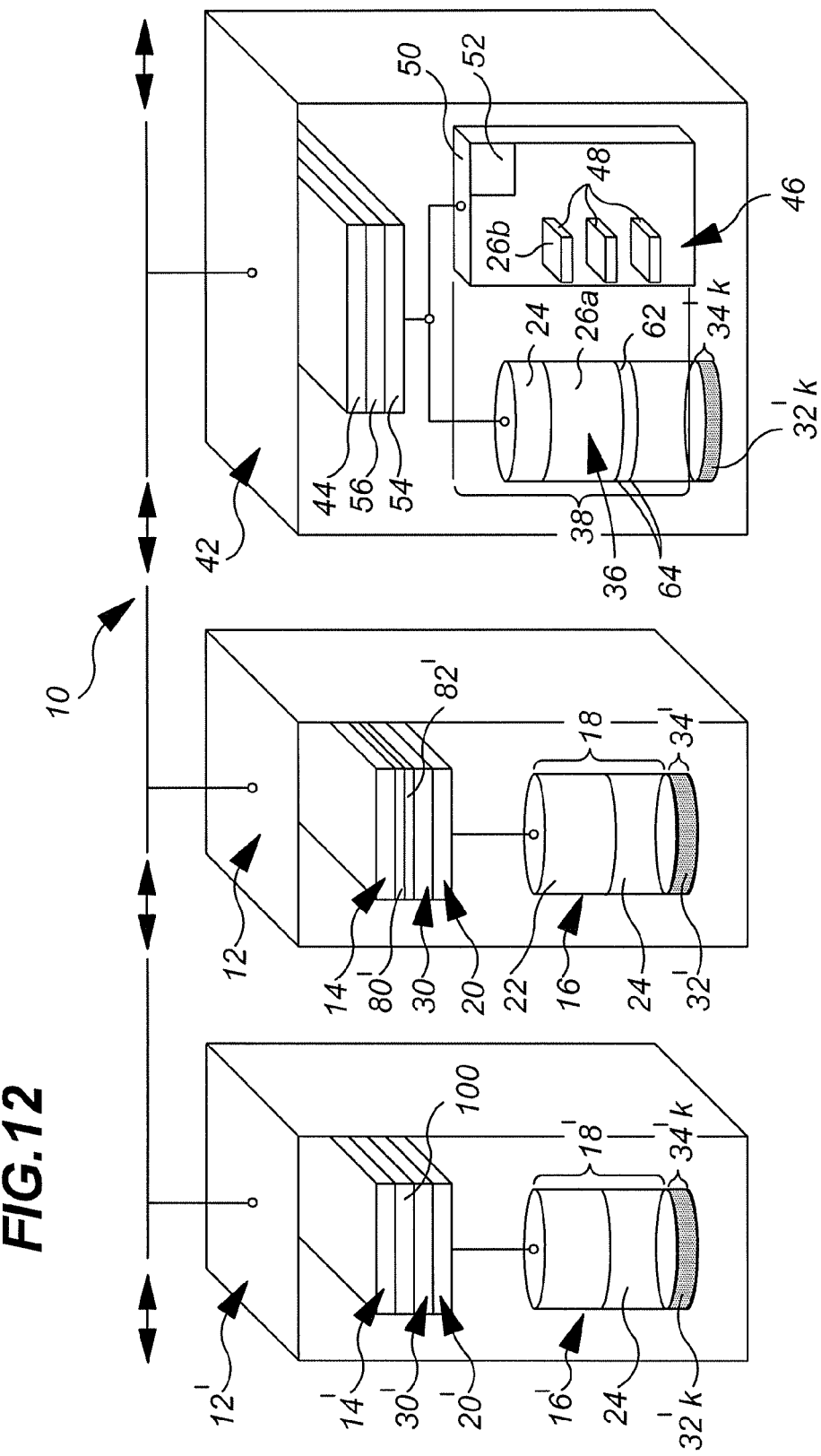
FIG. 12 shows an illustration of the eighth embodiment according to FIG. 11 with continuation of operations with additional copying of data files onto the backup server data memory of the backup file server.

Furthermore, it is possible B as illustrated in FIG. 12 B following a restart of the system by means of the backup file server 12' to retrieve the data files of the activity group 24 into the primary data file system 18' again.

For this purpose, a reactivation system 100 runs in the background on the backup file server 12' and this checks through all the metadata 32'k in the copied metadata file system 34'k and on the basis of the data file description data present in the metadata and one or more predeterminable priority criteria PK determines the sequence, in which the data files are intended to be retrieved from the secondary data file system 38 into the primary data file system 18' of the backup server 12'.

Figure 13:
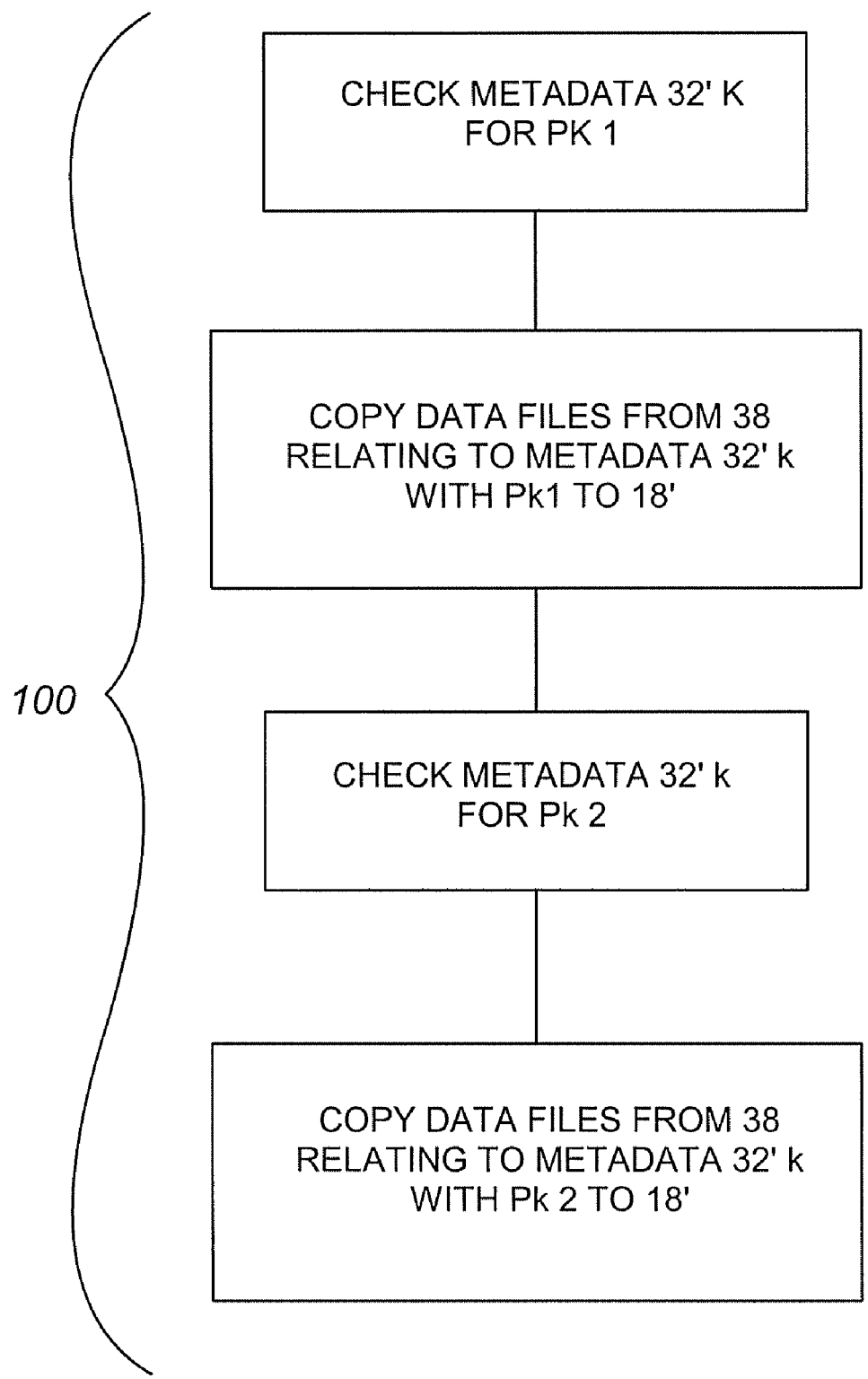
FIG. 13 shows a schematic illustration of a determination of priorities during the copying of data files onto the backup server data memory and FIG. 14 shows an illustration of a ninth embodiment of an inventive data processing unit, with which a backup server is provided for several file servers.

As illustrated, for example, in FIG. 13, the reactivation system 100 checks through the metadata 32'k first of all to see whether these fulfill the highest priority criterion PK1. All the data files in the secondary data file system 38, which belong to the metadata which fulfill the priority criterion PK1, are then copied onto the primary data file system 18' of the backup file server 12'.

Subsequently, the metadata 32'k are then checked to see whether they fulfill the priority criterion 2, i.e., a lower priority criterion. All the corresponding data files are then copied from the secondary data file system 38 onto the primary data file system 18' of the backup file server 12' again so that after a short time at least the data files of the activity group 24 which have the most current priority, if not all the data files of the activity group 24, are again present in the primary data file system 18' of the backup file server 12 and, therefore, the backup file server 12' is in a position to operate almost exactly as quickly, if not as quickly as the file server 12.

In this respect, it is to be emphasized that the retrieval of the data files from the activity group 24 by the reactivation system 100 takes place in the background and so parallel thereto the operating system 14' can still access, via the metadata 32'k, the data files from the activity groups 24 and 26 requested directly by the operating system 14'.

Figure 14:
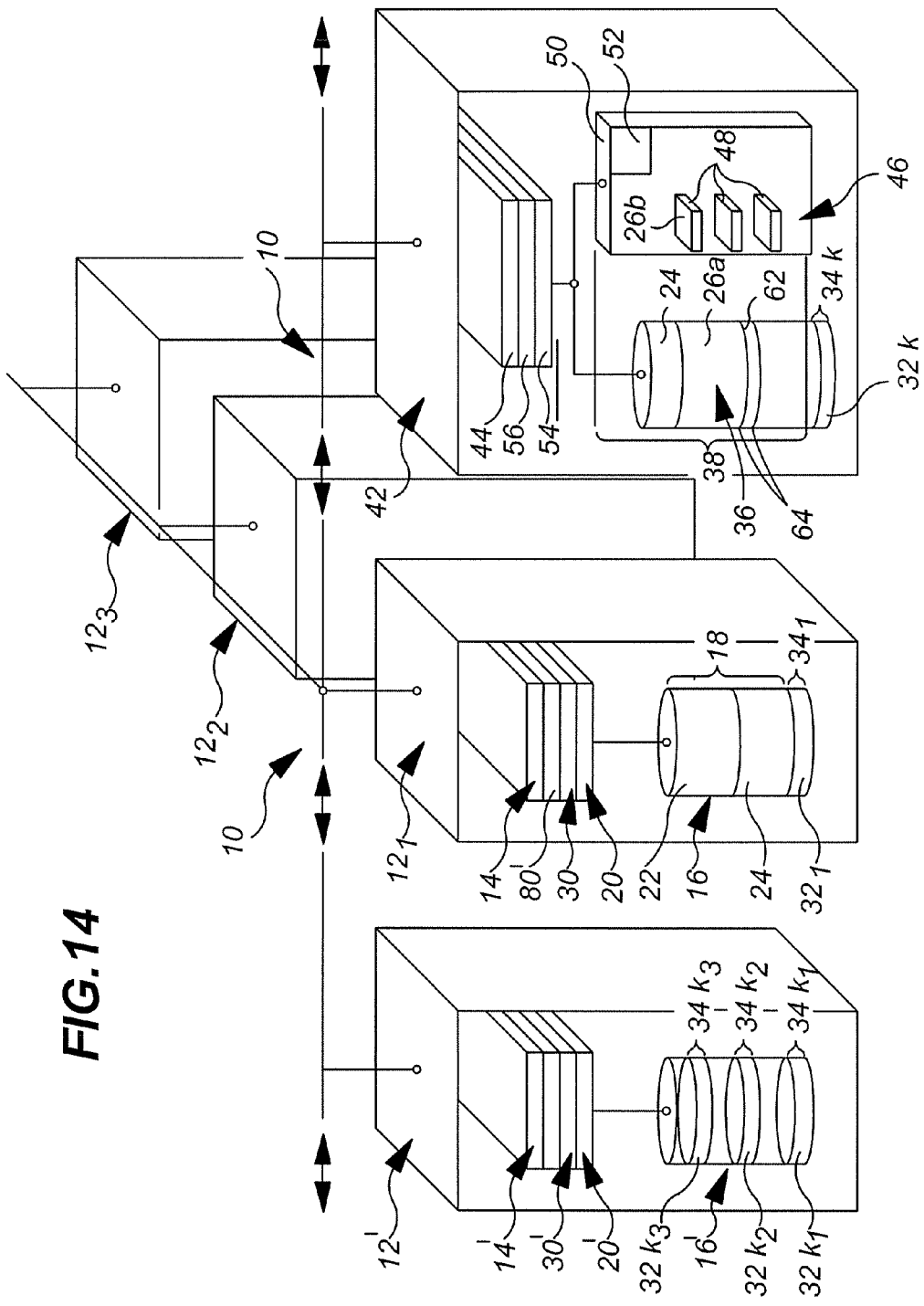

A ninth, advantageous embodiment of the inventive data storage unit, illustrated in FIG. 14, operates with several file servers $12_1$, $12_2$ and $12_3$ which all communicate with one another via the data network 10.

Each of the file servers $12_1$, $12_2$ and $12_3$ operates in the way described in conjunction with the embodiment according to FIGS. 11 to 13, i.e., the primary hierarchical memory management 20 has data files in the activity group 22 of the primary data file system 18 present for only a very short time and classifies the data files in the shortest possible time either in the primary activity group 24 or 26, as has been described in conjunction with the embodiment according to FIGS. 11 to 13.

In this embodiment, the metadata $32_{1,2,3}$ of the metadata file system $34_{1,2,3}$ are copied by means of the metadata backup management 80' in each of the file servers $12_1$, $12_2$ and $12_3$ onto the backup server data memory 16' so that this has the metadata file systems $34k_1$, $34k_2$, $34k_3$ with the metadata $32k_1$, to $32k_3$.

The backup file server 12' is therefore in a position to permit access to the data files of the activity groups $24_{1,2,3}$ and $26_{1,2,3}$ in the shortest possible time in the case of any failure of one of the file servers $12_1$ to $12_3$ since the metadata 32 required for this purpose are available immediately on the backup file server 12' and can be used to copy the required data file from the secondary data file system 38 on the backup server data memory 16' for its operating system 14'.

What is claimed is:

1. Data processing unit comprising:
   a data network,
   a file server integrated into the data network and having a separate data memory for the server and comprising at least one primary data file system, data files stored on the server data memory being filed in said data file system,
   at least one post-positioned data storage unit storing data in at least one secondary data file system said at least one post-positioned data storage unit comprising a first storage medium and a second storage medium,
   the data files of the primary data file system being divided into at least two primary activity groups with a different hierarchical ranking in accordance with a primary activity criterion by means of a primary hierarchical memory management, the memory management copying at least the data files of the primary activity group with a lowest ranking into said at least one secondary data file system onto one of said storage media of said post-positioned data storage unit,
   the memory management generating metadata from the copied data files of the primary activity group with a lowest ranking and storing the metadata on the primary data file system, each of the data files of the primary activity group with the lowest ranking having associated metadata wherein the associated metadata is managed under the same name as the associated data file and wherein the memory management, in response to an access to a first data file of the primary activity group: locates the first data file in the at least one secondary data file system using first metadata associated with the first data file, copies the first data file from the at least one secondary data file system to the primary data file system to make the first file available on the primary data file system for the access.

2. Data processing unit as defined in claim 1, characterized in that data files of a primary activity group with a higher ranking are also copied onto the secondary data file system and that metadata are generated from these data files.

3. Data processing unit as defined in claim 1, characterized in that the data files of the activity group with a lowest ranking are removed from the first data file system, metadata being generated from said data files.

4. Data processing unit as defined in claim 1, characterized in that in the secondary data file system the data files are divided by means of a secondary hierarchical memory management into at least two secondary activity groups with a different hierarchical ranking in accordance with a secondary activity criterion, that metadata are generated at least from the data files of the secondary activity group with the lowest ranking and the data files are themselves filed on a second storage medium of the data storage unit positioned subsequent to the server data memory.

5. Data processing unit as defined in claim 4, characterized in that in the secondary data file system at least the data files of the secondary activity group with a lowest ranking are removed from the first storage medium after their filing on the second storage medium and the formation of the metadata.

6. Data processing unit as defined in claim 4, characterized in that in the secondary data file system the data files are filed on the second storage medium and metadata generated also from data files of activity groups with a higher ranking.

7. Data processing unit as defined in claim 1, characterized in that a filter system recording activities in the primary data file system in a file-related manner is associated with an operating system of the file server.

8. Data processing unit as defined in claim 7, characterized in that the filter system includes the activities with respect to the data files in the primary data file system in a file-related manner.

9. Data processing unit as defined in claim 7, characterized in that the filter system transmits the activities to the primary hierarchical memory management for forming the primary activity groups.

10. Data processing unit as defined in claim 1, characterized in that the metadata are built up such that in the case of several secondary data file systems each data file filed in them is adapted to be located in each of the secondary data file systems with the same metadata.

11. Data processing unit as defined in claim 1, characterized in that a metadata backup management is provided for copying the metadata from the server data memory onto an additional data memory.

12. Data processing unit as defined in claim 1, characterized in that the data files of the primary activity groups having no metadata generated from them are copied by a user data backup management onto an additional data memory.

13. Data processing unit as defined in claim 1, characterized in that at least some of the data files of the primary data file system are copied onto an additional data memory, that metadata are generated from these data files and that the metadata are filed in a metadata file system on the server data memory.

14. Data processing unit as defined in claim 13, characterized in that the metadata file system is copied by a metadata backup management onto an additional data memory.

15. Data processing unit as defined in claim 14, characterized in that the additional data memory is a data memory of the data storage unit.

16. Data processing unit as defined in claim 15, characterized in that the additional data memory is the first data storage medium of the data storage unit positioned subsequent to the server data memory.

17. Data processing unit as defined in claim 14, characterized in that the additional data memory is the server data memory of an additional file server in the data network.

18. Data processing unit as defined in claims 13, characterized in that the at least one section of the data files of the primary data file system comprises the primary activity group with a lowest ranking.

19. Data processing unit as defined in claim 13, characterized in that in the case of the metadata present on the primary metadata file system, copies of said metadata being present on an additional data memory, a metadata backup management continuously detects alterations of the metadata in the primary metadata file system and that the metadata backup management updates the copies of the metadata undergoing alterations with respect to these alterations with a time delay determined by at least one update criterion.

20. Data processing unit as defined in claim 19, characterized in that the metadata backup management records by means of an alteration filter only those metadata undergoing alterations.

21. Data processing unit as defined in claim 19, characterized in that the metadata backup management accesses with a data file update system only the copied data files of metadata undergoing alterations and carries out the alterations in them.

22. Data processing unit as defined in claim 1, characterized in that in the case of the data files present on the primary data file system, data file copies of said data files being present on an additional data memory, a user data backup management continuously records alterations to the data files in the primary data file system and that the user data backup management updates the data file copies of the data files undergoing alterations with respect to the alterations with a time delay determined by at least one update criterion.

23. Data processing unit as defined in claim 22, characterized in that the user data backup management records by means of an alteration filter only the data files undergoing alterations.

24. Data processing unit as defined in claim 23, characterized in that the user data backup management accesses with a data file update system only the data file copies of the data files undergoing alterations and carries out the alterations in them.

25. Data processing unit as defined in claim 22, characterized in that the data file copies are present in the data storage unit positioned subsequent to the server data memory.

26. Data processing unit as defined in claim 25, characterized in that the data file copies are present in the secondary data file system.

27. Data processing unit as defined in claim 1, characterized in that in the case of any malfunction of the file server access to the data files having metadata generated from them is brought about first of all by making the metadata available on the primary data file system of the file server used.

28. Data processing unit as defined in claim 27, characterized in that once operation of the file server used has started with metadata the continuation of operations is brought about by copying data files onto the primary data file system of the file server used in accordance with a priority sequence determined from the metadata.

29. Data processing unit comprising:
a data network;
a file server integrated into the data network, having a separate server data memory and comprising at least one primary data file system, data files stored on the server data memory being filed in said data file system;
a post positioned data storage unit integrated into the data network and having a secondary data memory;
wherein the file server comprises a computer readable medium comprising computer instructions executable by a processor to divide the stored data files on the server data memory into at least two primary activity groups with a different hierarchical ranking in accordance with a primary activity criterion, copy the data files of the primary activity group with a lowest ranking into said at least one secondary data memory, generate associated metadata for each of the data files of the primary activity group with the lowest ranking having associated metadata, file the metadata associated with each of the data files in a metadata file system on the server data memory wherein the associated metadata is managed under the same name as the associated data file and remove the copied files, and, in response to an access to a first data file of the primary activity group: locate the first data file in the at least one secondary data memory using first metadata associated with the first data file, copy the first data file from the at least one secondary data memory to the primary data file system to make the first file available on the primary data file system for the access; and
a metadata backup management associated with the file server, the metadata backup management copying the metadata file system onto an additional data memory, external to said file server.

30. Data processing unit as defined in claim 29, wherein the additional data memory is a data memory of the post-positioned data storage unit.

31. Data processing unit as defined in claim 30, wherein the additional data memory is the first data storage medium of the post-positioned data storage unit.

* * * * *